(12) United States Patent
Isogai et al.

(10) Patent No.: US 9,458,255 B2
(45) Date of Patent: Oct. 4, 2016

(54) METHOD FOR PRODUCING STABILIZED FLUOROPOLYMER

(75) Inventors: Tomohiro Isogai, Settsu (JP); Tatsuo Suzuki, Settsu (JP); Tadashi Ino, Settsu (JP); Masahiro Kondo, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 13/260,907

(22) PCT Filed: Mar. 29, 2010

(86) PCT No.: PCT/JP2010/055552
§ 371 (c)(1),
(2), (4) Date: Sep. 28, 2011

(87) PCT Pub. No.: WO2010/113864
PCT Pub. Date: Oct. 7, 2010

(65) Prior Publication Data
US 2012/0035329 A1   Feb. 9, 2012

(30) Foreign Application Priority Data
Mar. 31, 2009  (JP) .................................. 2009-088264

(51) Int. Cl.
*C08F 8/20* (2006.01)
*C08F 8/22* (2006.01)

(52) U.S. Cl.
CPC .. *C08F 8/20* (2013.01); *C08F 8/22* (2013.01)

(58) Field of Classification Search
CPC .......... C08F 8/20; C08F 214/18; C08F 8/22; C08F 14/18
USPC .......................... 525/326.2–326.4, 355, 356; 526/247–250; 528/176, 480
See application file for complete search history.

(56) References Cited

U.S. PATENT DOCUMENTS

| | | | |
|---|---|---|---|
| 4,743,658 A * | 5/1988 | Imbalzano et al. | 525/326.4 |
| 4,859,747 A | 8/1989 | Bierschenk et al. | |
| 4,948,844 A * | 8/1990 | Nakahara et al. | 525/356 |
| 5,214,102 A | 5/1993 | Zielinski et al. | |
| 5,422,404 A | 6/1995 | Zielinsky et al. | |
| 2007/0129500 A1 * | 6/2007 | Honda et al. | 525/326.2 |
| 2009/0054687 A1 * | 2/2009 | Ikeda | 562/849 |
| 2010/0314153 A1 * | 12/2010 | Ishii et al. | 174/110 SR |

FOREIGN PATENT DOCUMENTS

| | | |
|---|---|---|
| CA | 1 248 292 A | 1/1989 |
| JP | 60-240713 A | 11/1985 |
| JP | 62-104822 A | 5/1987 |
| JP | 1-180839 A | 7/1989 |
| JP | 11-80839 A | 7/1989 |
| JP | 6-509139 A | 10/1994 |
| JP | 9-501974 A | 2/1997 |
| JP | 11-116710 A | 4/1999 |
| JP | 2002-332309 A | 11/2002 |
| JP | 2005-320497 A | 11/2005 |
| JP | 2007-51695 * | 2/2007 |
| WO | 9506069 A1 | 3/1995 |
| WO | 02079274 A1 | 10/2002 |
| WO | WO 02079274 A1 | 10/2002 |
| WO | WO 2008047906 A1 * | 4/2008 |
| WO | WO 2009102660 A1 * | 8/2009 |

OTHER PUBLICATIONS

"The Controlled Reaction of Hydrocarbon Polymers with Elemental Fluorine"; Polymer Letters Edition; vol. 12; pp. 177-184 (1974).
Database WPI; Week 198934; Thomson Scientific, London, GB; AN 1989-246420; XP002678664, & JP 1 180839 A (Kanto Denka Kogyo KK) Jul. 18, 1989.

* cited by examiner

*Primary Examiner* — Nicole M Buie-Hatcher
(74) *Attorney, Agent, or Firm* — Sughrue Mion, PLLC

(57) ABSTRACT

The present invention is aimed to provide a highly-productive method for producing a stabilized fluoropolymer. The present invention relates to a method for producing a stabilized fluoropolymer, comprising the step of bringing a fluoropolymer to be treated into contact with a fluorinating agent to produce a stabilized fluoropolymer, while maintaining the concentration of hydrogen fluoride present in a reaction vessel at not higher than 1.0% by volume.

4 Claims, No Drawings

METHOD FOR PRODUCING STABILIZED FLUOROPOLYMER

CROSS REFERENCE TO RELATED APPLICATIONS

This application is a National Stage of International Application No. PCT/JP2010/055552 filed Mar. 29, 2010, claiming priority based on Japanese Patent Application No. 2009-088264 filed Mar. 31, 2009, the contents of all of which are incorporated herein by reference in their entirety.

TECHNICAL FIELD

The present invention relates to a method for producing a stabilized fluoropolymer.

BACKGROUND ART

Fluoropolymers commonly have one or more thermally unstable terminal groups other than —$CF_3$, such as —COF, —COOH, —$CH_2OH$, and —$COOCH_3$, because of the polymerization mechanisms thereof though it depends, for example, on the polymerization initiator species and chain transfer agent species used in polymerization of the fluoropolymers. Such terminal groups in fluoropolymers may cause foaming or generation of hydrofluoric acid during molding, which may lead to a failure in molding or to mold corrosion.

Patent Document 1 discloses a method of fluorinative decomposition of polytetrafluoroethylene in which fluorinative decomposition is carried out in the presence of an alkali metal fluoride and/or an alkali earth metal fluoride. In addition, Non Patent Document 1 discloses a process including the step of mixing polyethylene with potassium fluoride followed by a fluorine flow through a reactor.
Patent Document 1: JP-A H1-180839
Non Patent Document 1: POLYMER LETTERS EDITION, VOL. 12, PP. 177-184 (1974)

SUMMARY OF THE INVENTION

Problems to be Solved by the Invention

However, the above documents do not disclose any methods for producing stabilized fluoropolymers by stabilizing unstable terminal groups of fluoropolymers. The present invention is aimed to provide a highly-productive method for producing a stabilized fluoropolymer.

Means for Solving the Problems

The present invention provides a method for producing a stabilized fluoropolymer, comprising the step (contacting step) of bringing a fluoropolymer to be treated into contact with a fluorinating agent to produce a stabilized fluoropolymer, while maintaining the concentration of hydrogen fluoride present in a reaction vessel at not higher than 1.0% by volume.

The present invention is specifically described in the following.

The method for producing a stabilized fluoropolymer of the present invention includes the step (contacting step) of bringing a fluoropolymer to be treated into contact with a fluorinating agent to produce a stabilized fluoropolymer. According to this method, unstable terminal groups in the fluoropolymer to be treated are fluorinated so that a stabilized fluoropolymer having stable —$CF_2T$ groups (T represents any of F, perfluoroalkyl group, and perfluoroalkoxy group, each optionally containing ethereal oxygen [—O—]) is produced.

Here, the term "fluoropolymer to be treated" refers to an untreated fluoropolymer which will be fluorinated in the contacting step.

In the production method of the present invention, the contacting step is carried out while the concentration of hydrogen fluoride present in a reaction vessel is maintained at not higher than 1.0% by volume. Accordingly, unstable terminal groups in the fluoropolymer to be treated are smoothly fluorinated, which significantly enhances the productivity of the stabilized fluoropolymer.

Hydrogen fluoride presumably generates during the conversion of unstable terminal groups in the fluoropolymer to be treated into stable terminal groups by a contact between the fluoropolymer to be treated and a fluorinating agent. It is not clear why the generated hydrogen fluoride inhibits fluorination of the unstable terminal groups. However, this is presumably because the unstable terminal groups and the hydrogen fluoride are interacted to inhibit decarboxylation.

The present inventors found out that fluorination of unstable terminal groups is not inhibited by hydrogen fluoride when the concentration of hydrogen fluoride present in a reaction vessel in which the fluoropolymer to be treated is brought into contact with a fluorinating agent is maintained at not higher than 1.0% by volume, which enables highly-efficient production of the stabilized fluoropolymer.

When the concentration of the hydrogen fluoride is higher than 1.0% by volume, stabilization of the unstable terminal groups does not proceed smoothly. The concentration of the hydrogen fluoride is preferably not higher than 0.10% by volume, more preferably not higher than 0.05% by volume, and still more preferably not higher than 0.01% by volume. The concentration is preferably closer to 0% by volume. Here, the concentration of the hydrogen fluoride is usually higher than 0% by volume.

The contacting step is carried out while the concentration of hydrogen fluoride present in a reaction vessel is maintained at not higher than 1.0% by volume. The concentration of hydrogen fluoride contained in gas discharged from the reaction vessel is preferably not higher than 1.0% by volume, as the unstable terminal groups are more smoothly fluorinated. The term "gas discharged" refers to: gas having passed through the reaction vessel or gas present in the reaction vessel after completion of the contact of a fluorinating agent, when the fluorinating agent is continuously supplied to the reaction vessel; or gas present in the reaction vessel after completion of the contact of a fluorinating agent when the fluorinating agent contacts with the fluoropolymer to be treated in batch or semi-batch mode in the reaction vessel. The gas discharged usually contains the fluorinating agent used and may further contain other gaseous components.

The concentration of hydrogen fluoride present in the reaction vessel is determined by the following steps. First, the reaction vessel is evacuated through an insertion pipe inserted therein by a corrosion-resistant diaphragm pump or the like. Then, the aspirated gas is introduced to an infrared spectrophotometer for determination. At this time, it is needed to limit the aspiration amount of the gas to a sufficiently small amount relative to the volume of the reaction vessel.

The concentration of hydrogen fluoride contained in gas discharged from the reaction vessel is determined by evaluating the gas sampled from a discharge pipe connected to the reaction vessel using an infrared spectrophotometer.

The hydrogen fluoride concentration in the case that a fluorinating agent contacts with the fluoropolymer to be treated in batch or semi-batch mode is determined by evaluating the gas sampled from the reaction vessel using an infrared spectrophotometer prior to opening of the vessel after completion of the contacting step.

The fluorinating agent is preferably at least one substance selected from the group consisting of $F_2$, $NF_3$, $SF_4$, $ClF$, $ClF_3$, $BrF_3$, and $IF_5$, more preferably at least one substance selected from the group consisting of $F_2$, $NF_3$, $SF_4$, and $ClF$, and still more preferably $F_2$.

The fluorinating agent may be mixed with gas inert to fluorination in advance and supplied into the reaction vessel in the form of a mixed gas. The gas inert to fluorination is not particularly limited, and may be nitrogen gas, argon gas, or the like. The amount of the fluorinating agent in the mixed gas is preferably not less than 1% by mass and more preferably not less than 10% by mass. The amount may be not more than 50% by mass, provided that it falls in the above range.

In the contacting step, the gas containing the fluorinating agent supplied into the reaction vessel preferably contains hydrogen fluoride at a concentration of not higher than 0.1% by volume. Lower concentration of hydrogen fluoride in the gas containing the fluorinating agent supplied into the reaction vessel allows smoother fluorination of unstable terminal groups.

The concentration of hydrogen fluoride in the gas containing the fluorinating agent supplied into the reaction vessel is determined using an infrared spectrophotometer.

The infrared spectrophotometer is preferably a Fourier-transform infrared spectrophotometer (FT-IR). The concentration of hydrogen fluoride in the gas containing the fluorinating agent supplied into the reaction vessel may be determined also by titration. Specifically, first, gas containing hydrogen fluoride and a fluorinating agent is bubbled in a potassium iodide aqueous solution (about 0.5% to 40% by mass of potassium iodide). The bubbled liquid changes color to blackish brown as the fluorinating agent liberates iodine. Then, the bubbled liquid is transferred to a separating funnel and iodine is extracted using chloroform. The fluoride ion concentration of an aqueous phase that has become clear is determined by ion chromatography or by a fluoride ion-selective electrode method. Based on the results, the concentration of the hydrogen fluoride is obtained. At this time, the concentration of the fluorinating agent can be determined by titration of a chloroform phase using sodium thiosulfate.

The contacting step is preferably carried out with the internal pressure of the reaction vessel at −0.09 to 3 MPa (gauge). The lower limit of the pressure is more preferably −0.05 MPa (gauge) and the upper limit thereof is more preferably 1 MPa (gauge). A too-high internal pressure of the reaction vessel is not preferable from the standpoint of safety. A too-low internal pressure of the reaction vessel is not preferable from the standpoint of productivity.

The contacting step is preferably carried out at a temperature of 0° C. or higher and 200° C. or lower. The step is more preferably carried out at 20° C. or higher, and still more preferably 50° C. or higher, while more preferably at 190° C. or lower, and still more preferably 185° C. or lower. A too-high temperature disadvantageously causes decomposition or fusion of the fluoropolymer. A too-low temperature leads to a longer treatment time, which is not preferable from the standpoint of productivity.

Though it depends on the amount of the fluoropolymer, the fluoropolymer and the fluorinating agent are preferably in contact with each other for one minute to 24 hours in the contacting step.

The contacting step may be repeated for a plurality of times. In addition, the production method of the present invention may include the step of bringing the fluoropolymer into contact with water between two successive repetitions of the contacting step repeated for a plurality of times.

The contacting step may be carried out continuously or in batch mode. The reaction vessel may be appropriately selected from stationary reactors such as tray reactors and cylindrical reactors; reactors equipped with a stirring impeller; rotating (tumbling) vessel reactors such as rotary kilns, double cone reactors, and V-shaped blenders; oscillating reactors; various fluidized bed reactors such as agitating fluidized bed reactors; and the like. When the fluoropolymer to be treated is resin powder or pellets, the fluorination is preferably carried out using a rotating vessel reactor or oscillating reactor, as the reaction temperature can be uniformly maintained with ease.

The production method of the present invention preferably includes the steps of: setting a fluoropolymer to be treated in a reaction vessel (i.e. setting step); bringing the fluoropolymer to be treated with a fluorinating agent in the reaction vessel to produce a stabilized fluoropolymer (i.e. contacting step); and recovering the stabilized fluoropolymer (i.e. recovering step).

The production method of the present invention may include a purification step. In the purification step, the fluorinating agent is passed through a gas flow tower (absorbing tower) filled with a hydrogen fluoride adsorbent, prior to the contacting step, for the purpose of lowering the hydrogen fluoride concentration of the gas containing the fluorinating agent supplied. The fluorinating agent or the gas containing the fluorinating agent which is to be passed through the gas flow tower may be one that has once been passed through and discharged from the reaction vessel.

The setting step may be a step for setting a fluoropolymer to be treated and a hydrogen fluoride adsorbent in a reaction vessel. The hydrogen fluoride adsorbent reacts with hydrogen fluoride to fix the hydrogen fluoride. Therefore, the hydrogen fluoride adsorbent in the reaction vessel can maintain the concentration of hydrogen fluoride in the reaction vessel within the above range. The fluoropolymer to be treated and the hydrogen fluoride adsorbent may or may not be in contact with each other.

The hydrogen fluoride adsorbent is substantially inert to fluorinating agents and reacts with or adsorbs hydrogen fluoride. The hydrogen fluoride adsorbent is preferably an inorganic fluoride, more preferably an alkali metal fluoride or ammonium fluoride, and still more preferably an alkali metal fluoride. Examples of the alkali metal fluoride include at least one fluoride selected from the group consisting of KF, NaF, and CsF. Among these, NaF is particularly preferable as the melting point of NaF is high and hydrogen fluoride absorbed therein has a low vapor pressure. In addition, polymers having terminal groups such as amide, particularly fluoropolymers, are usable as the hydrogen fluoride adsorbents.

In the case that the fluoropolymer to be treated and the hydrogen fluoride adsorbent are set in the reaction vessel in the setting step, the amount of the hydrogen fluoride adsorbent is preferably 1% by mass or more and 100% by mass or less, based on the amount of the fluoropolymer to be treated.

The production method of the present invention may also include a mixing step in which the fluoropolymer to be treated and the hydrogen fluoride adsorbent are mixed prior to the setting step. The hydrogen fluoride adsorbent reacts with hydrogen fluoride to fix the hydrogen fluoride, and therefore, mixing of the hydrogen fluoride adsorbent with the fluoropolymer to be treated allows maintenance of the hydrogen fluoride concentration in the reaction vessel within the above range.

In the mixing step, the amount of the hydrogen fluoride adsorbent mixed is preferably sufficient for adsorbing hydrogen fluoride to be generated. The amount is preferably 1% by mass or more and 100% by mass or less, based on the amount of the fluoropolymer to be treated. In the case that the hydrogen fluoride adsorbent is NaF, for example, the amount within the above range is sufficient for adsorbing the hydrogen fluoride.

The contacting step is preferably carried out while the fluorinating agent is continuously supplied to the reaction vessel, from the standpoint of quick removal of the generated hydrogen fluoride from the reaction vessel. In addition, though it depends on the amount of hydrogen fluoride generated in the fluorination reaction, the spatial time (value obtained by dividing reaction-vessel volume by supply rate of fluorinating agent) of the fluorinating agent is preferably not longer than one hour. The hydrogen fluoride concentration in the reaction vessel can be maintained within the above range by increase in the amount supplied of the fluorinating agent in the case that the reaction vessel volume is constant, or by reduction in volume of the reaction vessel in the case that the amount of the fluorinating agent supplied is constant. In the case of a batch mode, the hydrogen fluoride concentration in the reaction vessel can be maintained within the above range by sufficient increase in the reaction vessel volume or by increase in the frequency of replacement of the fluorinating agent during the step.

The production method including the purification step and the contacting step is one of the preferable embodiments of the production method of the present invention. In such a case, the contacting step is preferably carried out while a fluorinating agent or gas containing a fluorinating agent is continuously supplied to a reaction vessel and continuously discharged from the reaction vessel. In the purification step, the fluorinating agent or the gas containing the fluorinating agent, which is to be passed through a gas flow tower, may be one that has once been passed through and discharged from the reaction vessel. This treatment allows maintenance of the hydrogen fluoride concentration within the above range without the setting step.

The amount of hydrogen fluoride in the gas containing the fluorinating agent supplied to the reaction vessel can be determined by introduction of a measurement sample to a corrosion-resistant IR gas cell.

HF has a plurality of absorption peaks within 4100 to 4300 cm$^{-1}$ and the amount may be determined using any of these peaks.

The concentration can be determined from a calibration curve constructed using gas having a known hydrogen fluoride concentration and a peak height of the measurement sample.

The production method of the present invention may include a polymerization step in which fluorine-containing monomers are polymerized to give a fluoropolymer to be treated. In the polymerization step, fluorine-containing monomers and fluorine-free monomers may be polymerized to give a fluoropolymer to be treated. Though not particularly limited, the polymerization is preferably emulsion polymerization or suspension polymerization, for example.

The fluoropolymer to be treated preferably has an unstable terminal group. The fluoropolymer to be treated is obtainable by polymerization of fluorine-containing monomers and optionally copolymerization with fluorine-free monomers in accordance with the application purpose.

The fluorine-containing monomer is not particularly limited provided that it is a polymerizable compound containing a fluorine atom. Examples thereof include fluoroolefins, fluorinated alkyl vinyl ethers, and cyclic fluorinated monomers.

Examples of the fluoroolefin include ethylenic fluoromonomers described later.

Though not particularly limited, examples of the fluorinated alkyl vinyl ether include a fluorovinylether represented by the following formula:

CF$_2$=CF—O—Rf$^1$ wherein Rf$^1$ represents a C1-C9 fluoroalkyl group or a C1-C9 linear or branched fluoroalkyl group which may contain ethereal oxygen; and a hydrogen-containing fluorinated alkyl vinyl ether represented by the following formula:

CHY$^1$=CF—O—Rf$^2$ wherein Y$^1$ represents H or F and Rf$^2$ represents a C1-C9 linear or branched fluoroalkyl group which may contain ethereal oxygen.

The fluoropolymer to be treated may be prepared by (co)polymerization of one or two or more of the fluorinated alkyl vinyl ethers.

Examples of the cyclic fluorinated monomer include perfluorodioxols such as perfluoro-1,3-dioxol derivatives represented by the following formula:

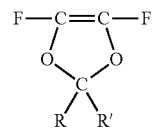

wherein R and R' are the same as or different from each other and each represent F, H, a C1-C10 alkyl group, or a C1-C10 fluoroalkyl group.

Examples of the fluorine-free monomer include hydrocarbon monomers reactive with the fluorine-containing monomers. The hydrocarbon monomer is preferably at least one type of monomers selected from the group consisting for example of alkenes, alkyl vinyl ethers, vinyl esters, alkyl allyl ethers, and alkyl allyl esters.

The fluoropolymer preferably has ethylenic fluoromonomer units derived from ethylenic fluoromonomers. The ethylenic fluoromonomer contains a vinyl group and no ethereal oxygen [—O—] therein. The vinyl group may have hydrogen atoms partly or wholly substituted by fluorine atoms. In the present description, the term "ethereal oxygen" refers to a -o- moiety contained in a monomer molecule.

Examples of the ethylenic fluoromonomer include a haloethylenic fluoromonomer represented by the following formula:

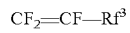

CF$_2$=CF—Rf$^3$ wherein Rf$^3$ represents F, Cl, or a C1-C9 linear or branched fluoroalkyl group);

and a hydrogen-containing fluoroethylenic fluoromonomer represented by the following formula:

$$CHY^2=CFY^3$$

wherein $Y^2$ represents H or F, and $Y^3$ represents H, F, Cl, or a C1-C9 linear or branched fluoroalkyl group.

Specific examples of the ethylenic fluoromonomer include tetrafluoroethylene (TFE), hexafluoropropylene, (HFP), chlorotrifluoroethylene (CTFE), vinyl fluoride, vinylidene fluoride (VDF), trifluoroethylene, hexafluoroisobutylene, and perfluorobutylethylene.

The ethylenic fluoromonomer is preferably at least one selected from the group consisting of ethylenic fluoromonomers represented by $CF_2=CF_2$, $CH_2=CF_2$, $CF_2=CFCl$, $CF_2=CFH$, $CH_2=CFH$, and $CF_2=CFCF_3$. Among these, more preferable are perhaloethylenic fluoromonomers, still more preferable are perfluoroethylenic fluoromonomers, and particularly preferable is TFE.

The fluoropolymer to be treated may be prepared by (co)polymerization of one or two or more of the ethylenic fluoromonomers mentioned above.

The fluoropolymer to be treated is preferably a copolymer produced by copolymeriazation of the ethylenic fluoromonomer and at least one type of monomers copolymerizable with the ethylenic fluoromonomer. Examples of the monomers copolymerizable with the ethylenic fluoromonomer include fluorinated alkyl vinyl ethers.

The fluoropolymer to be treated is preferably a copolymer produced by copolymerization of at least one ethylenic fluoromonomer mentioned above and at least one fluorinated alkyl vinyl ether mentioned above, and more preferably a binary copolymer produced by copolymerization of the ethylenic fluoromonomer and the fluorinated alkyl vinyl ether.

The fluoropolymer to be treated in the present invention preferably contains repeating units derived from at least one type of monomers selected from the group consisting of $CF_2=CF_2$, $CF_2=CFCF_2Rf^4$, $CF_2=CF-OCF_2Rf^4$, $CF_2=CF-ORf^5CF=CF_2$ ($Rf^4$ represents a C1-C10 fluoroalkyl group and $Rf^5$ represents a C1-C8 fluoroalkylene group which may contain ethereal oxygen) and a perfluoro-1,3-dioxol derivative. In particular, the fluoropolymer to be treated is more preferably a TFE copolymer containing repeating units derived from $CF_2=CF_2$.

The TFE copolymer is preferably a copolymer prepared from $CF_2=CF_2$, and a perfluoro (alkyl vinyl ether) [PAVE] and/or HFP, more preferably a TFE/PAVE copolymer [PFA] or a TFE/HFP copolymer, and still more preferably a TFE/perfluoro(propyl vinyl ether) copolymer. The TFE copolymer is preferably a perfluoroelastomer.

The fluoropolymer to be treated is preferably constituted by 50 to 100 mol % of the ethylenic fluoromonomer units and 0 to 50 mol % of the fluorinated alkyl vinyl ether units. The lower limit of the ethylenic fluoromonomer units is more preferably 65 mol % and still more preferably 70 mol %, relative to the total monomer units constituting the fluoropolymer to be treated. The upper limit thereof is more preferably 90 mol % and still more preferably 87 mol %, relative to the total monomer units constituting the fluoropolymer to be treated. The upper limit of the fluorinated alkyl vinyl ether units is more preferably 20 mol % and still more preferably 10 mol %, relative to the total monomer units constituting the fluoropolymer to be treated.

The monomer unit, such as the fluorinated alkyl vinyl ether unit or the ethylenic fluoromonomer unit, is a part of the molecular structure of the fluoropolymer to be treated, and refers to a moiety derived from the molecular structure of the monomer. For example, a TFE unit refers to a moiety $[-CF_2-CF_2-]$ derived from TFE $[CF_2=CF_2]$.

The fluoropolymer to be treated may be a polymer electrolyte precursor. The polymerization of the polymer electrolyte precursor is preferably carried out at a polymerization temperature of 20° C. to 100° C. and at a polymerization pressure of 0.3 to 2.0 MPaG. The polymer electrolyte precursor is prepared from vinyl ether monomers as mentioned below and may be converted to an ion-exchangeable polymer through hydrolysis.

Examples of the vinyl ether monomer used in the polymer electrolyte precursor include a fluorine-containing monomer represented by $CF_2=CF-O-(CF_2CFY^4-O)_n-(CFY^5)_m-A$ (wherein $Y^4$ represents a fluorine atom, a chlorine atom, or a perfluoroalkyl group; n represents an integer of 0 to 3; n $Y^4$s may be the same as or different from each other; $Y^5$ represents a fluorine atom or a chlorine atom; m represents an integer of 1 to 5; m $Y^5$s may be the same as or different from each other; A represents $-SO_2X^1$ and/or $-COZ^1$ wherein $X^1$ represents a halogen atom and $Z^1$ represents a C1 to C4 alkoxyl group). A preferable monomer composition (mol %) of the polymer electrolyte precursor is TFE unit:vinyl ether unit=(50 to 93):(50 to 7).

The polymer electrolyte precursor may be a precursor modified with third monomers within the range of 0% by mass to 20% by mass of the entire monomers. Examples of the third monomer include monomers such as CTFE, vinylidene fluoride, perfluoro alkyl vinyl ethers, and divinyl benzene.

The polymer electrolyte precursor may be subjected to the following treatment for use as a polymer electrolyte membrane in fuel cells. Namely, the precursor is made into a stabilized fluoropolymer by the production method of the present invention. Then, the stabilized fluoropolymer is shaped into a membrane, for example. The membrane is subjected to hydrolysis by an alkaline solution and treatment by a mineral acid to give a polymer electrolyte membrane.

Examples of the unstable terminal group which may be contained in the fluoropolymer to be treated include the following groups represented by Formulae (1) to (8):

$$-CFT-R^5 \tag{1}$$

$$-CFT-(R^6)_{n2}-OR^7 \tag{2}$$

$$-CFT-(R^8)_{n3}-COR^9 \tag{3}$$

$$-CFT-(R^{10})_{n4}-OCOOR^{11} \tag{4}$$

$$-CFTCONR^{12}R^{13} \tag{5}$$

$$-CFTCOOR^{14} \tag{6}$$

$$-CFTR^{15} \tag{7}$$

$$-COOCO- \tag{8}$$

wherein T represents F, a perfluoroalkyl group, or a perfluoroalkoxyl group; $R^5$ represents a C1-C10 hydrocarbon group with 1 to 3 hydroxy group(s), in which hydrogen atoms may be partly or wholly substituted by halogen atoms; $R^6$, $R^8$, and $R^{10}$ each represent a C1 to C10 alkylene group in which hydrogen atoms may be partly or wholly substituted by halogen atoms; $R^7$, $R^{11}$, $R^{12}$ and $R^{13}$ each represent a C1 to C10 alkyl group in which hydrogen atoms may be only partly, not wholly, substituted by halogen atoms (in Formula (5), $R^{12}$ and $R^{13}$ are the same as or different from each other); $R^9$ and $R^{14}$ are the same as or different from each other and each represent a fluorine atom or a C1-C10 alkyl group in which hydrogen atoms may be only partly, not wholly, substituted by halogen atoms; $R^{15}$ represents a hydrogen atom or a C1-C10 alkyl group in which hydrogen atoms may be only partly, not wholly, substituted by halogen atoms; n2, n3, and n4 are the same as or different from each other and each represent an integer of 0 or 1; and the perfluoroalkyl group and the perfluoroalkoxyl group may each contain ethereal oxygen.

The perfluoroalkyl group represented by T preferably contains 1 to 10 carbons. The perfluoroalkoxyl group represented by T preferably contains 1 to 15 carbons. The hydrocarbon group represented by $R^5$ may be an acyclic aliphatic hydrocarbon group, an alicyclic hydrocarbon group, or an aromatic hydrocarbon group such as a phenyl group.

Examples of the unstable terminal group include —CF$_2$COOCH$_3$, —CF$_2$CH$_2$OH, and —CF$_2$CONH$_2$.

The unstable terminal group is preferably at least one type of groups selected from the group consisting of the groups represented by the formulae (1), (2), (3), (4), (5), (6), (7), and (8). The unstable terminal group is preferably at least one type of groups selected from the group consisting of —CF$_2$COF, —CF$_2$COOH, —CF$_2$COOCH$_3$, —CF$_2$CH$_2$OH, —CF$_2$CONH$_2$, —COOCO—, and —CF$_2$H. The unstable terminal group is preferably at least one type of groups selected from the group consisting of —CF$_2$COF, —CF$_2$COOH, —CF$_2$CH$_2$OH, —CF$_2$COOCH$_3$, and —COOCO—. Here, —COOCO— represents a functional group formed by bonding of two —CF$_2$COOHs.

The fluoropolymer to be treated used in the present invention may contain other unstable terminal groups, such as —CF$_2$R$^{16}$ (—R$^{16}$ represents a C1 to C10 alkyl group) and —CF=CF$_2$, other than the aforementioned unstable terminal groups, provided that it has any of the unstable terminal groups.

The unstable terminal groups and other unstable terminal groups are not particularly limited, and examples thereof include: groups (i) derived from a polymerization initiator, a chain transfer agent, and/or a polymerization terminator which may be added in the polymerization reaction for obtaining the fluoropolymer to be treated; groups (ii) generated by a unimolecular termination (e.g. β-cleavage of vinyl ether); and groups (iii) modified, prior to the treatment of the present invention, from the above terminal groups by water, alcohol, amine, and the like which may be present in the ambient environment.

Examples of the groups (i) derived from a polymerization initiator, a chain transfer agent, and/or a polymerization terminator include groups corresponding to the above formulae (1) to (4), (6) and (7), such as: (i-a) —CF$_2$OCOOCH$_2$CH$_2$CH$_3$ which may generate when di-n-propyl peroxydicarbonate is used as a polymerization initiator; (i-b) —CF$_2$CH$_2$OH which generates at a rate of about 10% to 50% relative to the whole polymer terminals when methanol is used as a chain transfer agent; (i-c) —CF$_2$CH$_2$OCH$_3$ which may generate when dimethyl ether is used as a chain transfer agent; (i-d) —CF$_2$CH$_2$COCH$_3$ which may generate when acetone is used as a chain transfer agent; (i-e) —CF$_2$CH$_2$CH$_3$ which may generate at a rate of about 10% to 50% relative to the whole polymer terminals when ethane is used as a chain transfer agent; and (i-f) —CF$_2$CONH$_2$ which may generate at a rate of about 10% to 80% relative to the whole polymer terminals when methanol is used as a polymerization terminator.

Examples of the groups (ii) generated by a unimolecular termination include —CF$_2$COF. Examples of the groups (iii) modified from the terminal groups once generated in the above polymerization by the ambient media include: carboxy-containing groups (e.g. —CF$_2$CO$_2$H) modified from the —CF$_2$COF by water that may coexist with —CF$_2$COF; groups (e.g. —CF$_2$CO$_2$CH$_3$, —CF$_2$CO$_2$C$_2$H$_5$) made from the —CF$_2$COF to form an ester bond by an alcohol that may coexist with —CF$_2$COF; and groups (e.g. —CF$_2$CO$_2$NH$_2$, —CF$_2$CO$_2$N(CH$_3$)$_2$) modified from the —CF$_2$COF to form an amide bond when an amine or ammonium is used.

Among the modified groups (iii), the terminal group (5) or (6) may correspond to the unstable terminal group according to the present invention.

Terminal stabilization is more easily carried out on the unstable terminal groups of the fluoropolymer to be treated, when the unstable terminal group is represented by a formula selected from the group consisting of Formulae (1), (3), (5), and (6).

When the unstable terminal group is represented by a formula selected from the group consisting of Formulae (2), (4), and (7), terminal stabilization is efficiently carried out by a method in which oxidative gas such as oxygen is coexistent.

The fluoropolymer to be treated is usually an aggregate of a plurality of molecules of the fluoropolymer to be treated. The aggregate of a plurality of molecules of the fluoropolymer to be treated may be an aggregate of molecules of the fluoropolymer to be treated containing an unstable terminal group and molecules of the fluoropolymer to be treated not containing any unstable terminal group.

The aggregate of a plurality of molecules of the fluoropolymer to be treated may contain at least one unstable terminal group. Usually, it has a plurality of unstable terminal groups. For example, in the fluoropolymer to be treated, the number of unstable terminal groups may be larger than 10 for each 10$^6$ carbons. Though not particularly limited, the upper limit of the number of unstable terminal groups contained in the fluoropolymer to be treated is preferably not larger than 1000, for example. The number of unstable terminal groups may be the sum of —CF$_2$COF, —CF$_2$COOH, —CF$_2$CH$_2$OH, —CF$_2$COOCH$_3$, and —COOCO—.

The plurality of unstable terminal groups may be of just one type or two or more types in the aggregate of a plurality of molecules of the fluoropolymer to be treated. In the case of the two or more types of unstable terminal groups, the unstable terminal groups may be of two or more types in each molecule of the fluoropolymer to be treated. Or alternatively, the type of the unstable terminal groups may partly or wholly vary from molecule to molecule of the fluoropolymer to be treated.

In the treatment process of the present invention, the plurality of unstable terminal groups may be all converted to groups of the same type, may be converted to groups which are different from group to group, or may be partly converted so that some unconverted groups are included.

The number of unstable terminal groups can be determined by measurement using an infrared spectrophotometer [IR]. The infrared spectrophotometer is preferably a Fourier-transform infrared spectrophotometer (FT-IR). Specifically, the number of unstable terminal groups may be determined by the following procedures. The infrared absorption spectral analysis is carried out to a film sheet (about 0.25 to 0.30 mm in thickness) prepared from a fluoropolymer. The obtained infrared absorption spectrum is compared with that of a known film so that the unstable terminal groups are identified. The number of the unstable terminal groups is calculated using the difference spectrum and the following formula. The film sheet is usually obtained by compression molding at a molding temperature that is about 50° C. higher than the melting point and at a molding pressure of 5 to 10 MPa.

$$\text{The number of terminal groups (for each } 10^6 \text{ carbons)} = (I \times K)/t$$

I: Absorbance
K: Correction factor
t: Film thickness (mm)

The fluoropolymer to be treated in the present invention may be prepared by a conventionally known method such as solution polymerization, suspension polymerization, and emulsion polymerization. Emulsion polymerization or suspension polymerization is preferable because such a polymerization method allows the method for producing a stabilized fluoropolymer of the present invention to exhibit its effect the most.

The fluoropolymer to be treated may be in the form of resin powder, pellets, or a membrane obtained through molding. The fluoropolymer to be treated is preferably in the form of resin powder from the standpoint of sufficient treatment in each step described below. From the standpoint of industrial handleability, the fluoropolymer to be treated is preferably in the form of pellets.

The fluoropolymer to be treated may be prepared by a contact between a fluoropolymer as polymerized and an oxidant followed by hydrolysis of the generated —CFTCOF (wherein T is as mentioned above) with water or the like. The oxidant may be ozone, for example. The ozone may contain water vapor. Further, the fluoropolymer to be treated may be prepared by a high temperature treatment of a fluoropolymer as polymerized at 200° C. to 300° C. followed by hydrolysis of the generated —CFTCOF (wherein T is as mentioned above) with water or the like. Here, the high temperature treatment of a fluoropolymer as polymerized at 200° C. to 300° C. may be carried out in vacuo at not higher than 0.02 MPa. The treatment time may be 0.1 hours or longer, for example.

The production method of the present invention is capable of producing a stabilized fluoropolymer in which the number of unstable terminal groups is, for example, not larger than 10, preferably not larger than 6, and more preferably not larger than 4, for each $10^6$ carbons. The number of unstable terminal groups may be the sum of —$CF_2COF$, —$CF_2COOH$, —$CF_2CH_2OH$, —$CF_2COOCH_3$, and —COOCO—.

In the above contacting step of the production method of the present invention, the rate of converting unstable terminal groups in the fluoropolymer to be treated to —$CF_2T$ (wherein T is as mentioned above) is generally 90% or higher, and preferably 95% or higher.

The stabilized fluoropolymer obtained by the method for producing a stabilized fluoropolymer according to the present invention is usable for various painting materials, coating materials, and materials for various molded products. When the stabilized fluoropolymer is used in various materials, a variety of additives such as filler may be blended.

The stabilized fluoropolymer obtained by the production method of the present invention is particularly usable for materials such as materials used in a business field of semiconductors, optical functional materials, coated wires, optical waveguides, materials for antireflection coatings, and injection molded products.

The stabilized fluoropolymer is usable for coating materials for fuser rolls in electrophotographic machines, printers, copy machines, and the like; tubular moldings used in the fields of chemical industry, semiconductor manufacturing, automobile, information equipment, and the like; coating materials for coated wires; optical materials for optical devices such as optical waveguides, materials for sealing components required for processing optical devices, lens materials, light emitting elements, and optical materials for display devices such as antireflection coating materials.

When used for the optical materials, the stabilized fluoropolymer is preferably a copolymer of TFE and a perfluoro-1,3-dioxol derivative.

Examples of the optical materials for optical devices include, but are not limited to, light amplifier elements, optical switches, optical filters, optical branching elements, and wavelength converting elements. Optical circuits in which optical branching elements including N branching waveguides (N representing an integer of 2 or larger) and the elements mentioned above are combined are particularly usable in the highly advanced information-telecommunication society to come. Combination of these elements can be utilized in optical rooters, ONUs, OADMs, media converters, and the like.

The optical waveguide element may appropriately have a planer, strip, ridge, or buried form, for example, in accordance with the applications thereof.

The optical waveguide is constituted by a core portion and a clad portion. At least one of the core portion and the clad portion is preferably formed using the stabilized fluoropolymer produced by the method for producing a stabilized fluoropolymer according to the present invention.

The core portion refers to a high-refraction circuit formed on a substrate. The clad portion refers to a low-refraction portion formed around the core portion. Having a low refractive index in general, the stabilized fluoropolymer is preferably used to form at least the core portion of the optical waveguide. The optical waveguide may be formed by a known method such as etching, photobleaching, and injection molding.

Examples of the materials for sealing components required for processing optical devices include materials for packaging (encapsulation) and surface mounting of optical functional elements such as light receiving elements and light emitting elements including light emitting diodes (LEDs), EL elements, and nonlinear optical elements. Sealed optical elements are usable in various fields. Non-limiting examples thereof include: light emitting elements for a high mounted stop lamps, panels for meters, backlights of mobile phones, light sources for remote controllers of various electric devices, and the like; light receiving elements for autofocus systems of cameras and for optical pickups for CDs/DVDs. The stabilized fluoropolymer is also usable as a matrix polymer of color rendering materials for white LEDs.

Examples of the light-emitting elements include EL elements, polymer light emitting diodes, light emitting diodes, optical fiber lasers, laser elements, optical fibers, liquid crystal backlights, and photodetectors. The stabilized fluoropolymer is applicable to large-sized displays, illuminators, liquid crystal devices, optical disks, laser printers, lasers for medical use, laser processors, printers, copying machines, and so forth.

Examples of applications of the lens materials include pickup lenses, spectacle lenses, camera lenses, Fresnel lenses for projectors, and contact lenses.

Examples of applications of the optical materials for display devices include antireflective materials, illuminator coverings, display protective plates, transparent cases, display boards, and automotive parts. The stabilized fluoropolymer can also be used in optical disk substrates.

The stabilized fluoropolymer is also suitably used for antireflection coating materials. The antireflection coating materials commonly refer to materials of an antireflection layer constituting an antireflection film. The antireflection film refers to a film formed on a display surface for the purpose of avoiding reduction in screen contrast on the liquid crystal display surface. The antireflection film is constituted by all of or a part of the following layers: a plastic substrate, an acrylic hardcoat layer, an antireflection layer, and an antifouling layer, which are laminated in this order from the display surface side. In general, antireflection coating materials are preferable which have a low refractive index from the standpoint of lowering the reflectance of the screen. Because of its low refractive index and high transparency, the stabilized fluoropolymer obtained by the production method of the present invention has more excellent properties as an antireflection coating material compared to conventional organic materials.

In addition, the stabilized fluoropolymer is suitably formed into an injection molded product. Injection molding may be carried out by a known method and is not particularly limited. In the case that the stabilized fluoropolymer is PFA, the injection molding is preferably carried out at a molding temperature of 320° C. to 420° C. The injection molded product is preferably used in various housings, joints, and bottles, for example.

Effect of the Invention

Since the method for producing a stabilized fluoropolymer of the present invention has the above features, the production efficiency is significantly high.

EXAMPLES

The present invention is described below in more detail with reference to Examples and Comparative Examples, but is not limited only to these Examples.

In each of Examples and Comparative Examples, the following methods were employed to measure the hydrogen fluoride concentration and the melt flow rate.

(Measuring Method of Hydrogen Fluoride Concentration of Gaseous Sample)

An IR gas cell having a light path length of 10 cm was prepared which had a stainless-steel cylindrical body with a calcium fluoride window on each side and two gas-inlet pipes each having a needle valve, and secured air tightness using a fluororubber O-ring. The gas cell was connected to a reaction device and then evacuated, and a sample gas to be measured was aspirated from the reaction device until the pressure reached atmospheric pressure. Then, the valves were closed to seal the cell. The peak height at around 4230 $cm^{-1}$ of the profile measured by a Fourier-transform infrared spectrometer (Spectrum One-type spectrometer manufactured by PerkinElmer Co., Ltd.) and a calibration curve separately constructed were used to calculate the hydrogen fluoride concentration of the sample.

The gaseous sample used for the measurement of the hydrogen fluoride concentration was sampled after four hours from the reaction start, but prior to discharge of the fluorine gas in the autoclave.

(Measuring Method of Melt Flow Rate [MFR])

The MFR of a fluoropolymer was measured at 270° C. and at a load of 2.16 kg in accordance with JIS K 7210 using MELT INDEXER TYPE C-5059D (manufactured by Toyo Seiki Seisaku-Sho Ltd.). The mass of the extruded polymer was obtained in gram for each 10 minutes.

Example 1

A 300-cc autoclave made of SUS-316 was charged with 70 g of fluoropolymer pellets (AP-231PW (trade name) manufactured by Daikin Industries, Ltd.) consisting of tetrafluoroethylene [TFE] and perfluoro(propyl vinyl ether) [PPVE], and 1.0 g of NaF pellets (manufactured by Morita Chemical Industries Co., Ltd.). The mixture was heated in an oil bath to 120° C. After being sealed, the autoclave was subjected to an air tightness test. Next, nitrogen substitution was conducted for 10 times in which decompression to about 1 kPa by a vacuum pump and return to atmospheric pressure with nitrogen gas were sequentially conducted. After decompression to about 1 kPa by the vacuum pump again, the autoclave was charged with fluorine gas preliminarily diluted to 20% by mass with nitrogen until the pressure reached 0.01 MPa (gauge). Then, the reaction was started.

After four hours from the reaction start, the fluorine gas in the autoclave was discharged. The nitrogen substitution was repeated for 10 times and the autoclave was opened. In this manner, Sample 1 was obtained.

Comparative Example 1

Comparison Sample 1 was obtained in the same manner as in Example 1, except that the NaF pellets were not fed to the autoclave.

Example 2

A 50-L oscillating reactor (manufactured by OKAWARA CORPORATION) made of hastelloy was charged with 30 kg of AP-231PW pellets. After an air tightness test, the reactor was oscillated. Nitrogen substitution was conducted for 10 times with oscillation, in which decompression to about 7 kPa by a vacuum pump and return to atmospheric pressure with nitrogen gas were sequentially conducted. During this treatment, the autoclave was heated to 185° C.

After decompression again to about 1 kPa by the vacuum pump, the reactor was charged with fluorine gas preliminarily diluted to 20% by mass with nitrogen until the pressure reached 0.01 MPa (gauge). Then, the reaction was started. Separately, a gas flow tower filled with NaF pellets was provided. The fluorine gas was circulated between the reactor and the gas flow tower by a diaphragm pump so that the raw-material polymer was in contact with the 20% fluorine gas to be fluorinated. The rate of circulating the fluorine gas was 5 L/min. The internal volume of the gas flow tower was 3 L and filled with about 2.5 kg of NaF pellets. After four hours from the reaction start, the fluorine gas in the reactor was discharged. The nitrogen substitution was repeated for 10 times and the autoclave was opened. In this manner, Sample 2 was obtained.

Comparative Example 2

Comparison Sample 2 was obtained in the same manner as in Example 2, except that the fluorine gas was not circulated.

Example 3

(1) Polymer Synthesis

A 189-L pressure tight vessel made of SUS-316 equipped with a stirring blade and a temperature controlling jacket was charged with 90.6 kg of reverse osmosis water, 0.9 kg of $C_7F_{15}COONH_4$, and 6 kg of $CF_2$=$CFOCF_2CF_2SO_2F$. The system was substituted with nitrogen and evacuated. Then, TFE was introduced into the vessel to an internal pressure of 0.2 MPaG. The temperature in the system was adjusted to 47° C. with stirring at 189 rpm. After introduction of $CF_4$ as an explosion prevention material to 0.1 MPaG, TFE was further introduced to an internal pressure of 0.70 MPaG. A solution containing 3 L of water and 45 g of $(NH_4)_2S_2O_8$ dissolved in the water was introduced to the system and polymerization was started. TFE was additionally introduced so as to maintain the internal pressure at 0.70 MPaG. An amount of 0.7 kg of $CF_2\!\!=\!\!CFOCF_2CF_2SO_2F$ was continuously added for each 1 kg of TFE addition so as to continue the polymerization reaction.

After 360 minutes from the polymerization start, the pressure of TFE was discharged to terminate the polymerization when 25 kg of TFE was additionally introduced. An amount of 140 kg of the obtained polymerization liquid was added with 200 kg of water and further added with nitric acid so that coagulation occurred. The coagulated polymer was centrifuged and rinsed with ion-exchanged water passing therethrough. The rinsed polymer was dried in a hot air drier at 90° C. for 24 hours and then at 150° C. for 24 hours. In this manner, 35 kg of a polymer was obtained.

A 50-L oscillating reactor (manufactured by OKAWARA CORPORATION) made of hastelloy was charged with 30 kg of the polymer and 1.0 kg of NaF powder (manufactured by Morita Chemical Industries Co., Ltd., sodium fluoride). After an air tightness test, the reactor was oscillated. Nitrogen substitution was then conducted for 10 times with oscillation, in which decompression to about 7 kPa by a vacuum pump and return to atmospheric pressure with nitrogen gas were sequentially conducted. During this treatment, the reactor was heated to 120° C.

After decompression again to about 1.3 kPa by the vacuum pump, the reactor was charged with fluorine gas preliminarily diluted to 20% by mass with nitrogen until the pressure reached 0.01 MPa (gauge). Then, the reaction was started.

After 30 minutes from the reaction start, decompression was performed to about 1.3 kPa by the vacuum pump. Then, the reactor was charged with fluorine gas preliminarily diluted to 20% by mass with nitrogen until the pressure reached 0.01 MPa (gauge), so that the reaction was continued.

After four hours from the reaction start, the fluorine gas in the reactor was discharged. The nitrogen substitution was repeated for ten times, and 30 kg of Sample 3 was recovered from an outlet provided at a lower part of the reactor.

The MFR of the obtained sample was 3.2 (g/10 min.).

The sample was pressed with heat at 270° C. and at 10 MPa for 20 minutes to give a transparent membrane having a thickness of 170 μm.

The membrane was immersed in a 20% potassium hydroxide aqueous solution at 95° C. for 20 hours so that $SO_2F$ groups contained therein were converted to $SO_3K$. Then, the membrane was immersed in dilute sulfuric acid to be converted to a membrane containing $SO_3H$.

The membrane was found to have an equivalent weight (EW) of 741 by acid-base titration.

Comparative Example 3

An amount of 25 kg of Comparison Sample 3 was obtained in the same manner as in Example 3, except that NaF powder was not added.

The presence of the polymer fused on the bottom of the reactor after recovering of the sample indicated that the yield rate was lowered.

The following evaluation was carried out on each of the obtained Samples and Comparison Samples.

The sample in pellet form, among the obtained samples, was cut in half using a cutter knife. The cut sample was rolled with an oil hydraulic press to be formed into a film having a thickness of about 0.25 to 0.30 mm.

The sample in powder form was pressed with heat at 270° C. and at 10 MPa for 20 minutes to give a film having a thickness of about 0.25 to 0.30 mm.

The obtained films were each evaluated in a wave number range of 400 to 4000 $cm^{-1}$ by Fourier-transform infrared spectroscopy. The difference spectrum between the obtained film and a standard sample was obtained. Here, the standard sample was a sample sufficiently fluorinated until substantially no difference was found in spectrum. The absorbance value was read at the wave number assignable to each unstable terminal group, and the number of unstable terminal groups for each $10^6$ carbons was calculated according to the following formula:

Number of terminal groups for each $10^6$ carbons=$I \times K/t$ (In formula, I is absorbance mentioned above, K is correction factor shown in Table 1, and t is thickness (mm) of film subjected to measurement).

As for —$CF_2COOH$, the sum of the two values calculated according to the above formula for the two wave numbers assignable to —$CF_2COOH$ as shown in Table 1 was taken as the number of —$CF_2COOH$ terminal groups for each $10^6$ carbons.

When the number of terminal groups for each $10^6$ carbons calculated using the above formula is less than 1, the result is regarded as below the detection limit in the present measurement method. However, the presence of an unstable terminal group itself is not denied.

TABLE 1

| Unstable terminal group | Wave number ($cm^{-1}$) | Correction factor |
|---|---|---|
| —$CF_2CH_2OH$ | 3648 | 2325 |
| —$CF_2COF$ | 1880 | 405 |
| —$CF_2COOH$ | 1815 | 455 |
|  | 1779 |  |
| —$CF_2COOCH_3$ | 1789 | 355 |

The Fourier-transform infrared spectrometer used in the Fourier-transform infrared spectroscopy was a Spectrum One type spectrometer supplied by PerkinElmer Co., Ltd. Scanning was conducted for eight times.

Table 2 shows the evaluation results of the samples.

TABLE 2

| Sample | | AP231PW | Example 1 Sample 1 | Comparative Example 1 Comparison Sample 1 | Example 2 Sample 2 | Comparative Example 2 Comparison Sample 2 | Example 3 Sample 3 | Comparative Example 3 Comparison Sample 3 |
|---|---|---|---|---|---|---|---|---|
| Condition | Reaction temperature | — | 120° C. | 120° C. | 185° C. | 185° C. | 120° C. | 120° C. |
|  | Time | — | 4 hr | 4 hr | 4 hr | 4 hr | 4 hr | 4 hr |

TABLE 2-continued

| | Sample | AP231PW | Example 1 Sample 1 | Comparative Example 1 Comparison Sample 1 | Example 2 Sample 2 | Comparative Example 2 Comparison Sample 2 | Example 3 Sample 3 | Comparative Example 3 Comparison Sample 3 |
|---|---|---|---|---|---|---|---|---|
| | Fluorine concentration | — | 20% | 20% | 20% | 20% | 20% | 20% |
| | Material | — | 70 g | 70 g | 30 kg | 30 kg | 30 kg | 30 kg |
| | HF absorbent    NaF | — | 1.0 g | 0 g | 2.5 kg | 0 kg | 1.0 kg | 0 kg |
| | HF concentration in system (% by volume) | — | 0.03% | 1.6% | 0.08% | 2.1% | 0.12% | 5.4% |
| Number of terminal groups | —$CF_2CH_2OH$ | 184 | 40 | 113 | 0 | 0 | 0 | 0 |
| | —$CF_2COF$ | 29 | 56 | 33 | 2 | 24 | 0 | 0 |
| | —$CF_2COOH$ | 26 | 29 | 5 | 0 | 0 | 8 | 52 |
| | —$CF_2COOCH_3$ | 76 | 6 | 14 | 0 | 0 | 0 | 0 |
| | Sum | 315 | 131 | 165 | 2 | 24 | 8 | 52 |

INDUSTRIAL APPLICABILITY

The production method of the present invention is particularly useful as a method for producing a stabilized fluoropolymer that is utilized in materials such as materials used in a business field of semiconductors, optical functional materials, coated wires, optical waveguides, materials for antireflection coatings, injection moldings, and fuel cells.

The invention claimed is:

1. A method for producing a stabilized fluoropolymer, comprising the step of bringing a fluoropolymer to be treated into contact with a fluorinating agent in a stationary reactor to produce a stabilized fluoropolymer, while maintaining the concentration of hydrogen fluoride present in a reaction vessel at not higher than 1.0% by volume, wherein the contacting step is carried out at a temperature of 50° C. or higher and 185° C. or lower, and the fluoropolymer to be treated is in the form of a resin powder, a pellet, or a membrane obtained through molding, and the fluoropolymer to be treated is constituted by 50 to 100 mol % of an ethylenic fluoromonomer unit and 0 to 50 mol % of a fluorinated alkyl vinyl ether unit, and the fluoropolymer to be treated has an unstable group and the unstable group is at least one group selected from the group consisting of —$CF_2COF$, —$CF_2COOH$, —$CF_2CH_2OH$, —$CF_2COOCH_3$, and —COOCO—, wherein —$CF_2COF$ —$CF_2COOH$, —$CF_2CH_2OH$ and —$CF_2COOCH_3$ are terminal groups and wherein —COOCO— represents a group formed by bonding two —$CF_2COOH$ terminal groups.

2. The method for producing a stabilized fluoropolymer according to claim 1, wherein the fluorinating agent is at least one substance selected from the group consisting of $F_2$, $NF_3$, $SF_4$, ClF, $ClF_3$, $BrF_3$, and $IF_5$.

3. The method for producing a stabilized fluoropolymer according to claim 1, wherein the fluorinating agent is $F_2$.

4. The method for producing a stabilized fluoropolymer according to claim 1, wherein the contacting step is carried out at a temperature of 50° or higher and 120° or lower.

* * * * *